(12) United States Patent
Gutman

(10) Patent No.: US 8,436,271 B2
(45) Date of Patent: May 7, 2013

(54) THERMAL NUCLEUS FUSION TORCH METHOD

(75) Inventor: Baruch Boris Gutman, New York, NY (US)

(73) Assignee: Baruch Boris Gutman, Far Rocka-Way, NY (US)

( * ) Notice: Subject to any disclaimer, the term of this patent is extended or adjusted under 35 U.S.C. 154(b) by 524 days.

(21) Appl. No.: 12/803,469

(22) Filed: Jun. 28, 2010

(65) Prior Publication Data

US 2011/0253682 A1    Oct. 20, 2011

Related U.S. Application Data

(60) Provisional application No. 61/342,451, filed on Apr. 14, 2010.

(51) Int. Cl.
*B23K 10/00* (2006.01)

(52) U.S. Cl.
USPC .................................................. 219/121.48

(58) Field of Classification Search ............. 219/121.48, 219/76.16, 121.57, 124.01, 130.4, 121.44, 219/121.55, 121.59, 121.84, 260, 261, 267, 219/270, 121.64, 121.72, 121.11, 121.36, 219/121.56, 121.67; 427/18, 446, 8; 217/76.16
See application file for complete search history.

(56) References Cited

U.S. PATENT DOCUMENTS

| | | | | |
|---|---|---|---|---|
| 5,521,350 | A * | 5/1996 | Nishi et al. | 219/121.56 |
| 5,643,475 | A * | 7/1997 | Karino et al. | 219/121.57 |
| 5,653,896 | A * | 8/1997 | Couch et al. | 219/121.44 |
| 7,030,979 | B2 * | 4/2006 | Hammer | 356/316 |
| 7,399,944 | B2 * | 7/2008 | DeVries et al. | 219/121.48 |
| 8,129,656 | B2 * | 3/2012 | Reichmann et al. | 219/121.59 |
| 2005/0236376 | A1 * | 10/2005 | Eccles | 219/121.36 |

OTHER PUBLICATIONS

B. Gutman, "Effect of modulation of the plasma arc on the spraying parameters", in Journal"Svarochnoe proizvodstvo"(USSR), No. 9,pp. 17-19, 1984.
B.Gutman, Method of Supplying of the Plasmotron, Certificate (USSR) No. 702934, 1978.
B.Gutman, Method of Supplying of the DC Arc Plasmotron, Certificate (USSR) No. 1227096, 1984.
B.Gutman, Method for Plasma Spraying of the Coatings, Certificate (USSR) No. 1400463, 1986.
B.Gutman,Method for Plasma Spraying of the Coatings, Certificate (USSR) No. 1551225, 1986.
B.Gutman, Method of the Plasma Treatment, Certificate (USSR) No. 1632670, 1989.
B. Gutman, Methods and devices for plasma spraying and plasma cutting, Israel's Patent No. 103069, 1995.
B. Gutman, Pulsed Plasma and Laser Technologies and their Business Aspects, Cambridge International Science Publishing, 203 pp., 2000.
B. Gutman, Plasma Spraying Arc Current Modulation Method, USA Patent No. 5,900,272, and PCT/US98/22011, WO 99/22042, 1999.
James Marder, Bhakta Rath, Stephen Obenschain, International Thermonuclear Experimental Reactor, Advanced Materials & Processes/Feb. 2008.
M. Gasparotto, ITER: Status of the Project, F4E—ITER Department Barcelona—Spain, Information Day on H&CD Power Supplies for ITER Barcelona, May 27, 2009.

* cited by examiner

*Primary Examiner* — Steven Loke
*Assistant Examiner* — Tram H Nguyen

(57) ABSTRACT

There is an improved fusion plasma torch apparatus-engines and method. Deuterium-Tritium or other fusion reaction reagents are injected in a fusion reaction channel where is a current of an arc upon which is imposed modulated current extinguishing whatever transversal plasma arc vibrations thereby eliminating a plasma arc bypassing to a wall and consequently decreasing the heat losses at the expense of dropping down convective and conductive heat exchange and locating the plasma arc column strictly in the center of arc's channel.

5 Claims, 6 Drawing Sheets

THERMAL NUCLEUS FUSION TORCH METHOD

The present application claims priority to U.S. provisional patent application Ser. No. 61/342,451 filed Apr. 14, 2010, which is incorporated herein by reference in its entirety.

FIELD AND BACKGROUND OF THE INVENTION

The invention relates to the field of Thermo-Nuclear fusion methods and apparatus and more particularly to Deuterium & Tritium synthesis of Helium and by any other thermo-nuclear reaction which have the major problem to prevent a contact of plasma with walls.

There are a number of shortcomings and deficiencies of current fusion devices and methods, among of which is the following. One of them is the usually non stable plasma jets have to be situated in the center of arc channel having not touched the walls of a fusion reactor—have to be confined by a strong magnetic fields. "The minimum temperature at which such a system could operate may be found by equating that portion of the reaction energy carried by the charged particles to the radiation loss. This temperature is $3 \times 10^8$ degrees for the D-D reaction and $5 \times 10^7$ degrees for the T-D reaction." At 50-100 million degrees, the temperature of the deuterium-tritium plasma is so high that the nuclei can be confined only by a strong magnetic field.

Method of location of an arc plasma torch in the center of arc channel by superposition the pulses of frequency modulation onto plasma arc could sustain thermo nuclear synthesis in the center of plasma arc channel without to be confined by magnetic fields. Intensity of conductive and convective heat exchanges in the area of resonance modulation frequencies drop down. In this case, the heat loss is mostly determined by the plasma arc radiation directed from modulated DC/AC arc to a wall of the reactor channel. The rise of the heat efficiency (.eta.) at the first subtraction modulation frequency $\nu_1 = 300$ Hz (b) is about 25%; meanwhile at addition modulation (a) is within 3% only (FIG. 1). Thus, subtractive modulation is within one order of magnitude more effective than addition one in meaning of suppressing conductive and convective heat exchanges and consequently hindering to moving plasma fragments to walls direction.

Direct measurements of length of the arc are supported by above model of plasma behavior in the arc channel. The length of modulated DC arc (L) became maximal at the same resonance frequency and equal or more then total length of anode's arc channel (FIG. 2). Consequently, the arc is situated in the center of the channel.

Collected data about cathode erosion (G) are supporting above model of plasma behavior as well (FIG. 3). These data are convincing from vie point of erosion the same model of a plasma column. In this case the first subtractive modulation resonance frequency conduces to decreasing the erosion of the cathode bypassing point, apparently at the expense of diameter of plasma column decreasing.

Process of superposition of modulation pulses (sec arc current oscillogram at resonance frequency below) onto DC/AC arc [for example: Plasma Current (15 MA for ITER) is very sensitive to subtractive pulse duration (.mu.s) and amplitude (.DELTA.I) at arc voltage (U) and current (I), FIGS. 4 and 5].

SUMMARY OF THE INVENTION

The present invention is provided by plasma generator of any types: DC, AC with a plasma arc bypassing in diffuse mode to electrodes. Flow of Deuterium & Tritium, Helium-3+Deuterium or any other fusion reacting mixtures create stabilization the arc upon which subtractive pulses of current of modulation is imposed.

The present invention by set up resonance modulation frequencies results a maximum effect of heat efficiency (.eta.) at the expense of illumination of conductive and convective plasma heat exchange is provided.

The present invention by rise of the length of modulated arc (L) situated in the channel center at resonance modulation frequencies is provided.

The present invention in precise area of subtractive modulation resonance frequency which is strictly sensitive to pulse duration, ratio of pulse amplitude to arc current, frequency recurrence, slope of the pulse is provided.

The length of anode channel must be determined and restricted by maximal average length of the arc determined previously under certain resonance frequency.

BRIEF DESCRIPTION OF THE DRAWINGS

The invention is herein described, by way of example only, with reference to the accompanying drawings, wherein.

DESCRIPTION OF THE PREFERRED EMBODIMENTS

The design of DC/AC plasma generator could be also similar to described in U.S. Pat. No. 5,900,272, FIGS. 1,2,3,9 describe Thermal-Nuclear Fusion source of Energy/Fusion Propulsion engine. The principles of operation and the innovations incorporated into the invention may be better understood with reference to the drawings and the accompanying description.

D/C or A/C arc is ignited for example in a gap between anode and cathode. In order to prevent an intensive erosion of electrodes, both of them are blew on by Helium or argon or any other gases to provide diffuse attachment mode between plasma arc and electrodes.

Next stage is imposing subtracting pulses on the arc arcing in thermo nucleus reaction mixture like Deuterium & Tritium, Helium-3+Deuterium or any other fusion reacting mixtures having created a stabilization of the arc upon which subtractive pulses of current of modulation is imposed.

The interaction between the shock-waves at certain (resonance) modulation frequencies $\nu_m$ and de-energized arc may lead to a reduced cross component of the arc intrinsic vibrations. The gap existing between the arc and the anode wall tends to increase whereby the large scale bypassing oscillations process is weakened only to contribute to La growth. The process is likely to shift the transition area to the anode cut. Given that the anode was selected to correspond as much as possible to the greatest arc length—the thermal flux going to the wail failed to intensify because of convective and conductive heat-exchange occurring at the interface between the thermal and boundary layer, whereas the losses onto the wall were largely depend upon the radiated heat exchange.

In a case of set up a resonance's modulation frequency results a maximum effect of heat efficiency .eta. (FIG. 1) at the expense of illumination of conductive and convective heat exchange.

The result of this is a rise of the length of modulated arc L (FIG. 2) situated in the channel center at resonance modulation frequencies upon which subtractive modulation resonance frequency conduces to decreasing the erosion G of the cathode bypassing point (FIG. 3), apparently at the expense of the diameter of plasma column decreasing. Consequently, the arc is situated in the center of the channel and diameter of arc is decreased.

Figure 1:
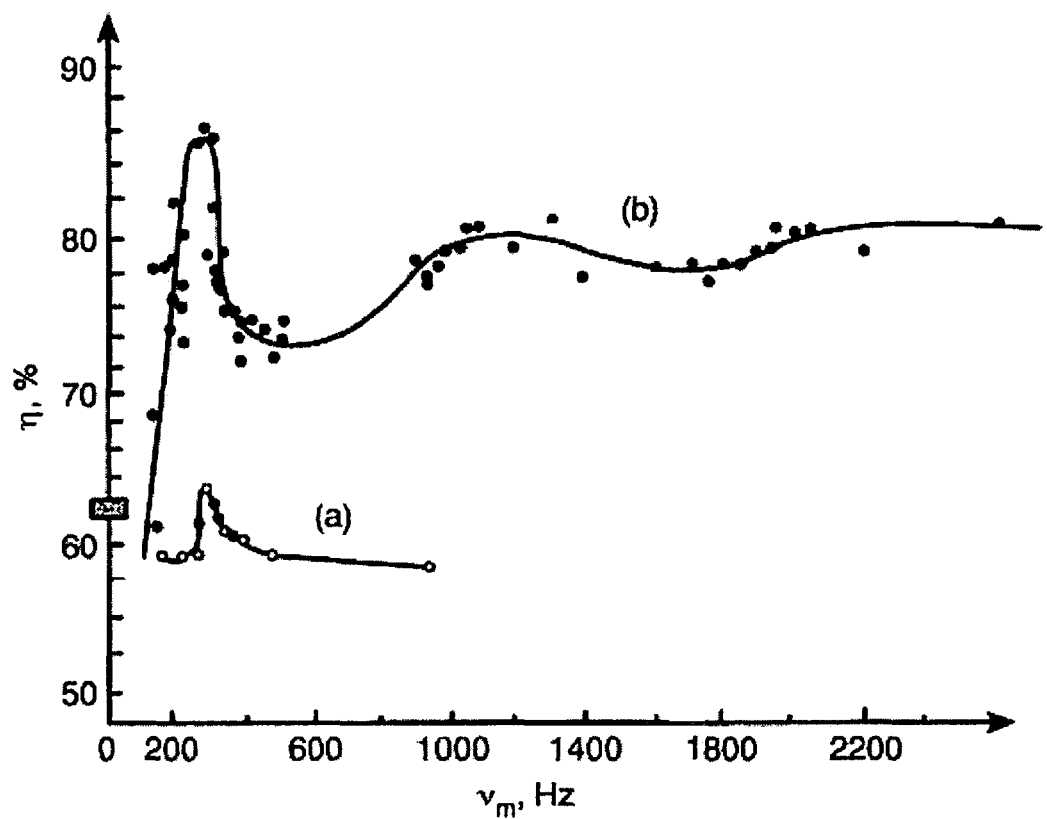
FIG. 1 is heat efficiency $\eta$ versus frequency of modulation $\nu$ (black spot on axis $\eta$ is a value of heat efficiency without modulation).
Figure 2:
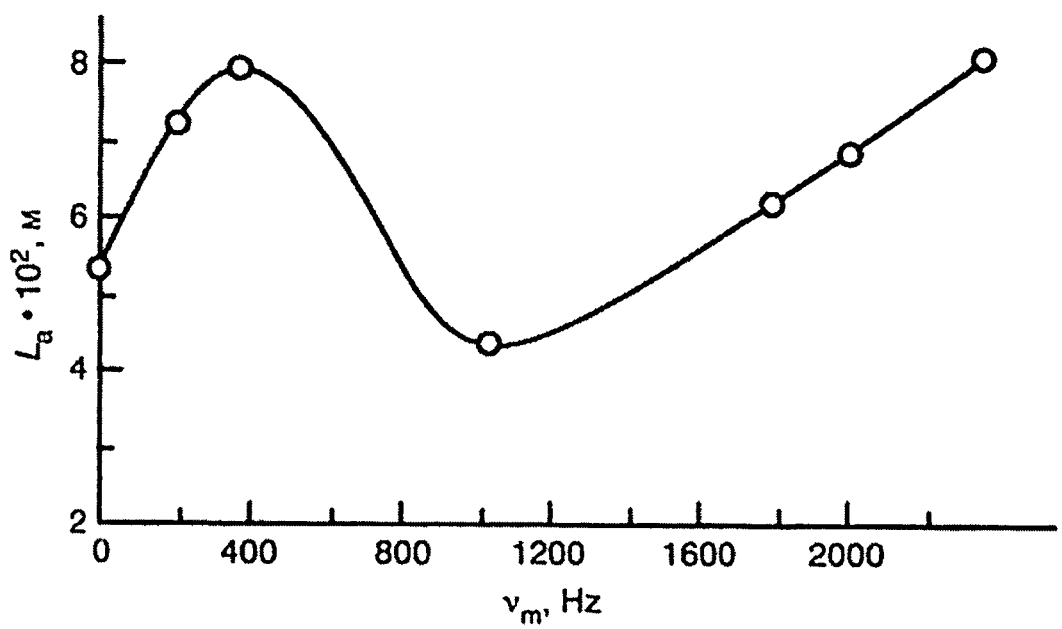
FIG. 2. Arc length $L_a$ versus frequency modulation $\nu_m$
Figure 3:
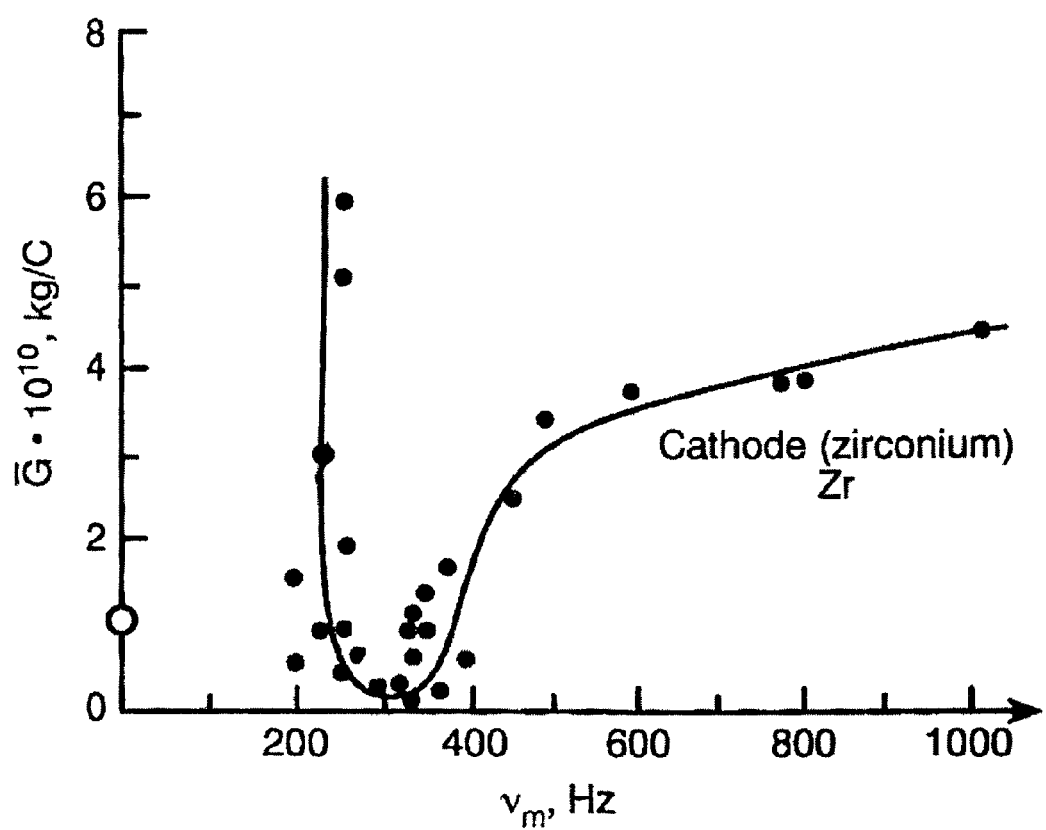
FIG. 3. is cathode erosion (G) versus frequency of modulation $\nu_m$
Figure 4:
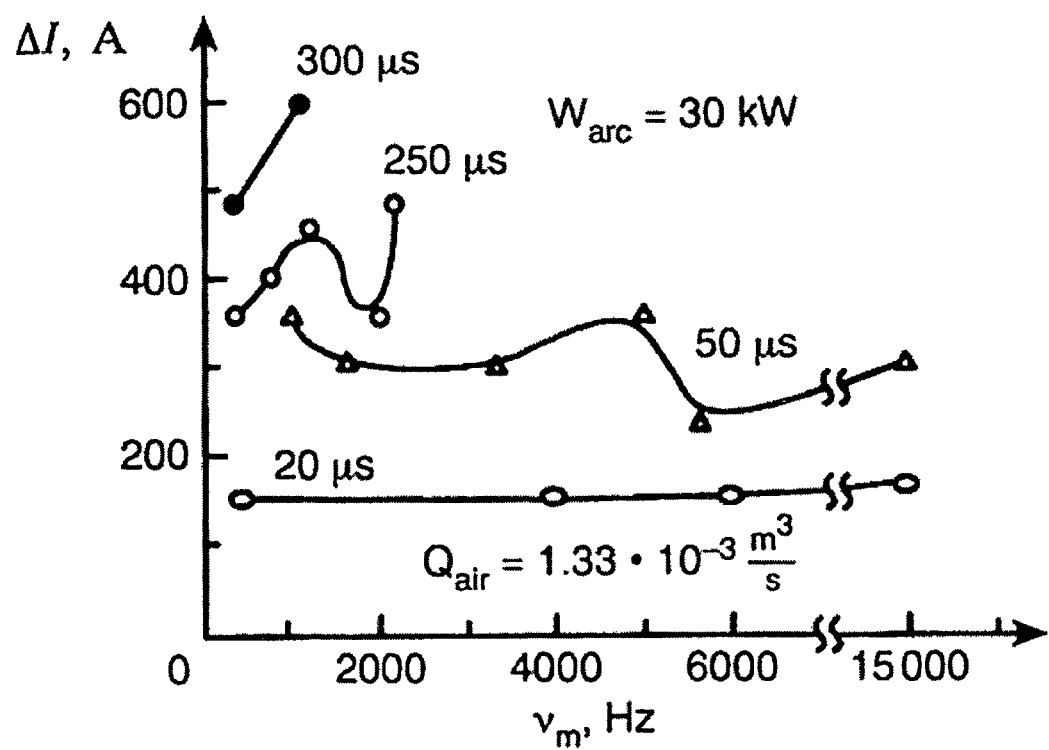
FIG. 4. Pulse current amplitude $\Delta I$ under different pulse duration (μs) versus frequency of modulation $\nu_m$.
Figure 5A:
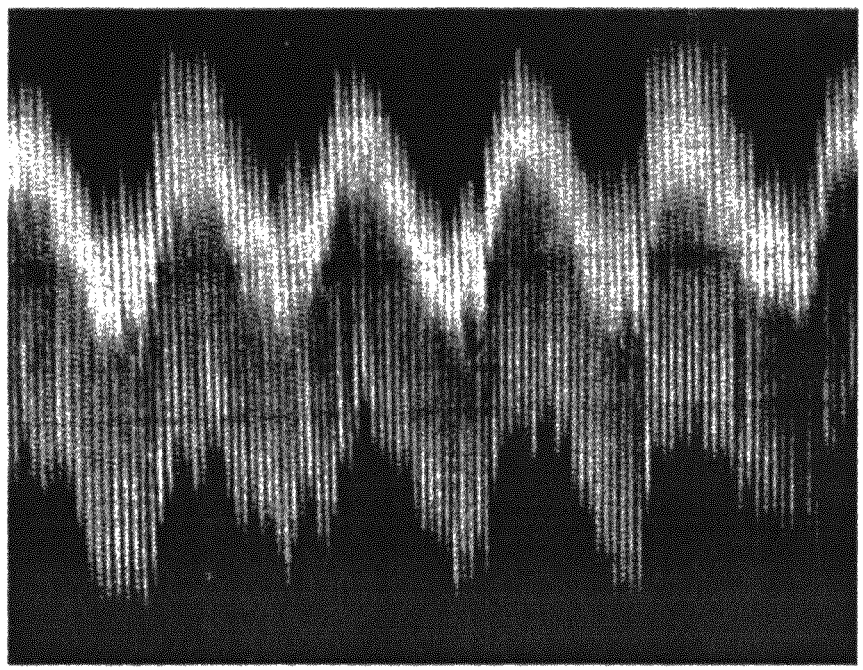
FIG. 5(a) is average current I and voltage U under different pulse duration (vs) versus frequency of modulation $\nu_m$.
Figure 5B:
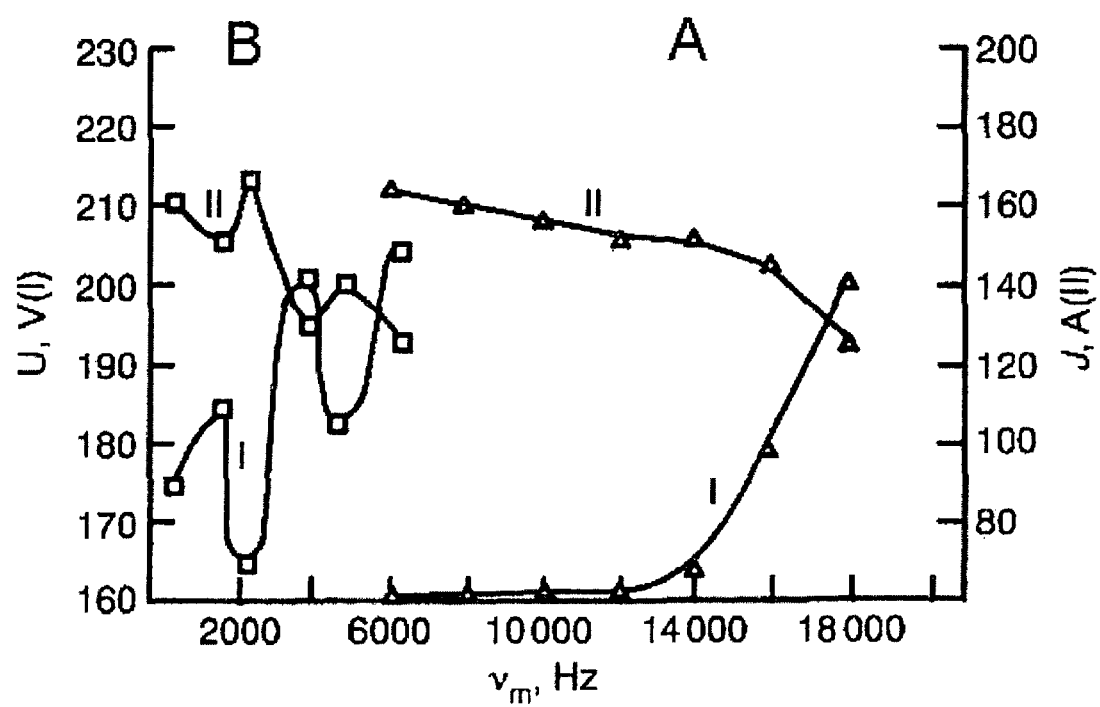
FIG. 5(b) is the current oscillogram of intrinsic oscillations of the plasma arc and the imposed pulse current.

The present invention is provided in precise area of subtractive modulation resonance frequency which is strictly sensitive to pulse duration, ratio of pulse amplitude to arc current, frequency recurrence, slope of the pulse (FIGS. 4,5).

Thus, modulated Plasma arc is located in minimized-relatively small cross section of the center of the arc channel, corresponding to conductive and convective heat exchange to be minimized, and arc length to be maximized, corresponding to locating plasma reaction far from the channel's walls and consequently-eventually get rid of significant part plasma beat losses of fusion reaction to the walls.

While the invention has been described with respect to a limited number of embodiments, it will be appreciated that many variations, modifications and other applications of the invention may be made.

What is claimed is:

1. A method of igniting nuclear fusion reaction in a plasma torch comprising the steps of:
    (a) igniting a plasma arc in a plasma forming gas and continuing plasma arc operating;
    (b) imposing on the plasma arc pulses of any polarity current
    (c) changing a shift of phase, duration of pulses, and frequency parameters of imposing modulated current on the plasma arc to find out their range corresponding with a maximum thermal efficiency of the plasma torch and finding out the range corresponding with a maximum thermal efficiency of the plasma torch;
    (d) injecting any nuclear fusion reaction components into the plasma arc at a moment when the plasma torch thermal efficiency increasing dramatically up to maximum value and igniting nuclear fusion reaction.

2. The method as define in claim 1 wherein the plasma arc attached to electrodes of the plasma torch at a diffuse mode at an expense of blowing the electrodes by substances with less ionization energy than the plasma forming gas.

3. The method as define in claim 1 wherein measurements of an average length of modulated plasma arc corresponding with the maximum thermal efficiency is a length of an anode of the plasma torch comprising the steps of:
    (a) determine a total length of the plasma arc by changing the shift of phases and frequencies;
    (b) determine a value of the anode length corresponding with maximal length of modulated arc and the maximal thermal efficiency accordingly.

4. The method as define in claim 1 wherein the plasma arc operates at minimal value of a cathode erosion in the plasma torch.

5. The method as define in claim 1 wherein the ignited plasma arc being stabilized by vortex gas flow to prevent the contaminations in a central area of the plasma arc.

* * * * *